United States Patent
Lee et al.

(10) Patent No.: US 10,834,876 B2
(45) Date of Patent: Nov. 17, 2020

(54) BLOWER WITH MOTION DETECTOR

(71) Applicant: TTI (MACAO COMMERCIAL OFFSHORE) LIMITED, Macau (MO)

(72) Inventors: Hei Man Raymond Lee, Kwai Chung (HK); Yong Min Li, Dongguan (CN); Ming Jun Zhuang, Dongguan (CN)

(73) Assignee: TTI (MACAO COMMERCIAL OFFSHORE) LIMITED, Macau (MO)

( * ) Notice: Subject to any disclaimer, the term of this patent is extended or adjusted under 35 U.S.C. 154(b) by 302 days.

(21) Appl. No.: 16/133,819

(22) Filed: Sep. 18, 2018

(65) Prior Publication Data
US 2019/0082624 A1    Mar. 21, 2019

(30) Foreign Application Priority Data
Sep. 20, 2017    (CN) ...................... 2017 2 1208551 U

(51) Int. Cl.
*A01G 20/47* (2018.01)
*G01C 19/00* (2013.01)
*A47L 5/14* (2006.01)

(52) U.S. Cl.
CPC ................ *A01G 20/47* (2018.02); *A47L 5/14* (2013.01); *G01C 19/00* (2013.01)

(58) Field of Classification Search
CPC .................................. A01G 20/47; A47L 5/14
See application file for complete search history.

*Primary Examiner* — Andrew A Horton
(74) *Attorney, Agent, or Firm* — Michael Best & Friedrich LLP

(57) ABSTRACT

A blower is provided, which comprises a housing, a blowpipe coupled to the housing, a motor located within the housing, and blades driven by the motor to generate air flow. The blower also comprises a motion sensor. The motion sensor is adapted to control the operation of the motor in response to changes in position or angle of the blower. The motion sensor can determine the angle between the blower and the horizontal plane, thereby intelligently determining whether the user wants to carry the blower by hand and wants to perform air blowing, and controls the operation of the motor accordingly.

8 Claims, 2 Drawing Sheets

BLOWER WITH MOTION DETECTOR

FIELD OF THE DISCLOSURE

The disclosure relates to a power tool, in particular to a hand-held electric blower.

BACKGROUND

Hand-held blowers are often used in a variety of indoor or outdoor locations, such as being used for cleaning up the garden, or removing debris from the floor. Generally, a hand-held blower has a long blowpipe for outputting air flow generated in the body through the blowpipe to the area to be operated. However, existing blowers are generally simple in structure, and only provide a main power switch (such as a trigger) on the body for the user to control ON/OFF of the blower. However, during operation, the user may not always need the blower to operate. For example, when the blower is lifted up for short-distance transportation, or when the direction of the blowpipe is being adjusted, the blower is not intended to operate during these short periods of time, causing undesired wind to blow into the non-working area. However, in these cases, the user needs to use fingers to pull the trigger each time, which causes triviality and inconvenience in use.

SUMMARY

Accordingly, embodiments of the present invention provide an improved blower that overcomes the above-described technical problems.

In one aspect of the utility model, a blower is provided, which includes a housing, an blowpipe coupled to the housing, a motor located within the housing, and blades driven by the motor to generate air flow. The blower further contains a motion sensor. The motion sensor is adapted to control the operation of the motor in response to changes in position or angle of the blower.

Preferably, the motion sensor is adapted to detect the angle formed by the blowpipe and the horizontal plane.

More preferably, the motion sensor is configured to control the motor to start upon detecting that the angle between the blowpipe and the horizontal plane is greater than a first threshold, and to control motor to stop upon detecting that the angle between the blowpipe and the horizontal plane is less than the first threshold.

In a variant embodiment, the motion sensor is configured to control the motor to stop upon detecting that the angle between the blowpipe and the horizontal plane is greater than a second threshold. The first threshold described above is less than the second threshold.

In a specific embodiment, the first threshold is 15 degree.

In another specific embodiment, the second threshold is 30 degree.

In another variant embodiment, the motion sensor is an angle detection sensor or a gyro sensor.

In another variant embodiment, the blower further comprises a trigger switch for enabling/disabling the motion sensor.

The blower provided by the utility model thus incorporates some elements of intelligent control. Although the main power switch similar to a trigger is still provided on the body of the blower, with the motion sensor, the user does not need to repeatedly operate the main power switch. Instead, the motion sensor can determine the angle between the blower and the horizontal plane, thereby intelligently determining whether the user is carrying a blower and wants to conduct blowing work. If the user does not want to blow, for example, by placing the blower on the floor or carrying it during transportation, the angle between the blower and the horizontal plane will not reach the predetermined range and the blower will not start. The blower will only start when the user is carrying the blower and making it tilted downward to reach an angle within a predetermined range. This design not only reduces the user's labor, but also prevents the blower from starting when it is not needed, which saves energy and prolongs the service life, and prevents the wind generated by the blower from causing unnecessary environmental impact.

BRIEF DESCRIPTION OF THE DRAWINGS

The performance and advantages of the present invention will be further understood from the remainder of the specification and the accompanying figures; the same components in the figures have the same reference. In some cases, a sub-tag is placed after a label and hyphen to represent one of many similar components. When referring to a label but not specifically state an existing sub-tag, it refers to all of these similar components.

DETAILED DESCRIPTION OF PREFERRED EMBODIMENTS

Embodiments of the present invention use motion sensors to intelligently determine the orientation of the blower relative to the horizontal plane to control the operation of the motor. Other different benefits and advantages provided by the various embodiments of the present invention are readily apparent from the following description.

Figure 1:
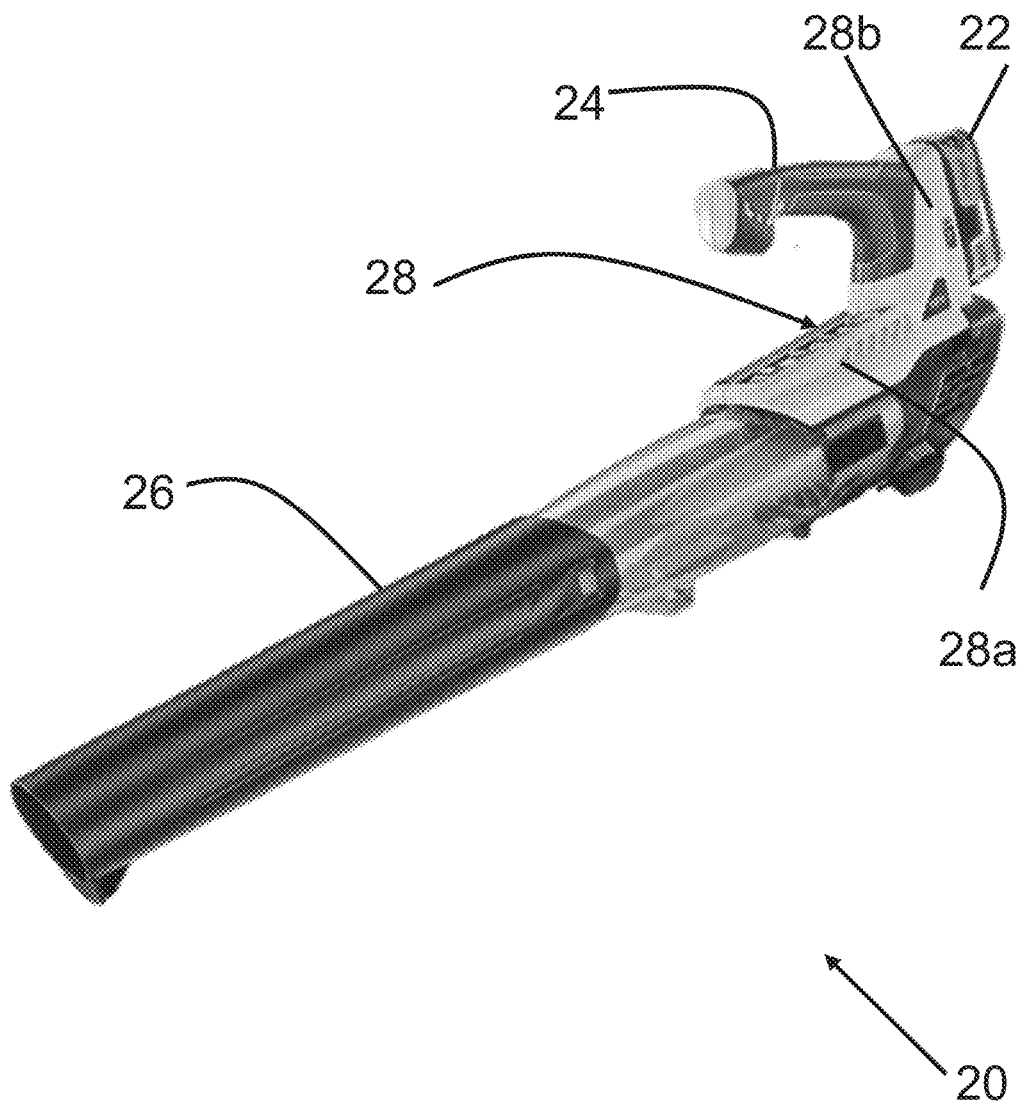
FIG. 1 illustrates the appearance of a blower in accordance with one embodiment of the present invention.

Now turning to FIG. 1, a blower 20 in accordance with the first embodiment of the present invention has a housing 28 as a part of the body. The housing 28 has a base portion 28a and an upper extension portion 28b extending upwardly from the base portion 28a. The handle 24 extends forwardly from the upper extension portion 28b toward the blowpipe 26 such that the handle 24 is substantially parallel to the base portion 28a. The blowpipe 26 is connected to the housing 28 and has a length to convey the wind generated by the blower 20 to the distal end. Behind the upper extension portion 28b, a battery pack 22 is detachably connected to serve as a power supply for supplying power to the motor (not shown) of the blower 20 located inside the housing 28. In addition, a motion sensor (not shown) is mounted in the housing 28, which is coupled to a control circuit (not shown) of the blower 20 to control the operation of the motor. On the handle 24, there are also two trigger switches (not shown) for controlling the total power supply of the blower 20 and for controlling the activation of the motion sensor respectively.

Figure 2:
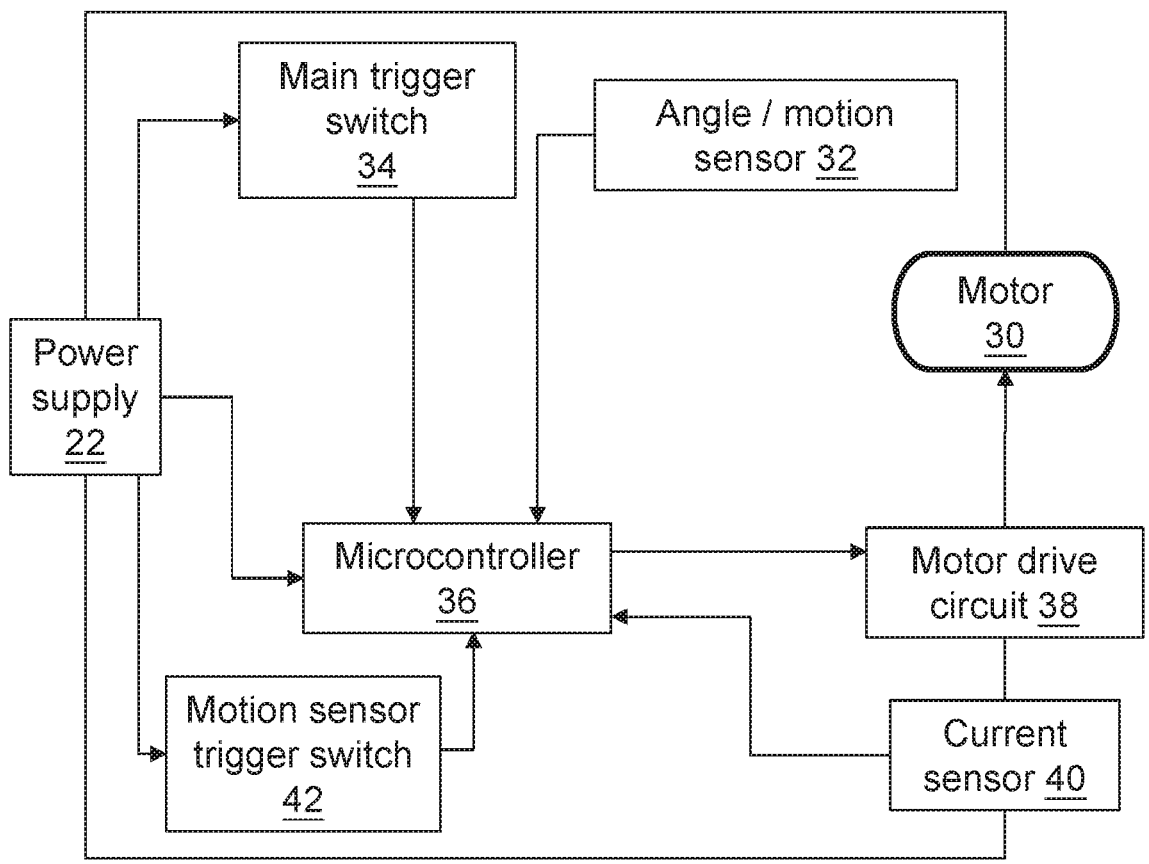
FIG. 2 illustrates a schematic diagram of internal current connections of a blower in accordance with another embodiment of the present invention.

Now turning to FIG. 2, there is illustrated the internal structure of a blower in accordance with one embodiment of the present invention. A power supply 22, such as the battery pack described above, is coupled to motor 30 to provide power to the latter. Although the power supply 22 is shown to be directly coupled to the motor 30 in FIG. 2, it does not mean that the motor 30 is always in an activated state. As will be described below, the activation of motor 30 also depends on some other control components shown in FIG.

2. Firstly, there is a microcontroller 36 in the internal circuitry of the blower that acts as a central control unit to receive inputs from different user input switches, data from different sensors, and uses these to control the operation of the motor 30. The blower has an angle/motion sensor 32, which can be an angle sensor (e.g. a magneto-resistive sensor), or a gyro sensor. The angle/motion sensor is coupled to the microcontroller 36 and sends the detected angle data of the blower relative to the horizontal plane to the microcontroller 36. The horizontal plane herein refers to a virtual plane that is perpendicular to the direction of gravity. The microcontroller 36 is coupled to a motor drive circuit 38 to provide commands to the motor drive circuit 38 such that the latter can further control the operation of motor 30. A current sensor 40 is also coupled to the microcontroller 36 for detecting the output current of motor 30 and transmitting the data to microprocessor 36. The two trigger switches contain a main trigger switch 34 and a motion sensor trigger switch 42, both of which are coupled to the power supply 22 and the microcontroller 36.

The operating principle of the blower in FIG. 2 described above will now be described. Firstly, if the blower is to be operated, the user should operate the main trigger switch 34 so that it is in an ON state, and accordingly the microcontroller 36 will receive a signal that the main trigger switch 34 is in an ON state. However, the fact that the main trigger switch 34 is in the ON state is not equal to that the motor 30 will begin to rotate immediately. In addition to the main trigger switch 34, the motion sensor trigger switch 42 also determines the operation of the motor 30. If the motion sensor trigger switch 42 is in the OFF state, the function of the angle/action sensor 32 is turned off, at which time the motor 30 will continue to operate as long as the main trigger switch 34 is in the on state.

Conversely, if the main trigger switch 34 is in the ON state, but the motion sensor trigger switch 42 is also in the ON state, then the operation of the motor 30 will depend on the angle formed by the blowpipe of the blower and the horizontal plane, i.e. the tilt state of the body. At this time, the angle/motion sensor 32 is activated, which detects the angle of the blowpipe in real time and feeds the data back to the microcontroller 36. If the microcontroller 36 detects that the angle between the blowpipe (air outlet) of the blower and the horizontal plane is greater than the first threshold, the motor is automatically activated, i.e. the operation of the blower is started. If the microcontroller 36 detects that the angle between the blowpipe and the horizontal plane is less than the first threshold, the operation of the blower is automatically stopped. However, if the angle between the blowpipe (air outlet) and the horizontal plane are too large to exceed the second threshold, the microcontroller 36 will still stop the operation of the blower. The second threshold is set to prevent the blower from being activated when it is in an overly tilted state (e.g. the blowpipe is vertical, and the outlet is facing downwardly). In the present embodiment, the first threshold is set to 15 degree and the second threshold is set to 30 degree. In other embodiments, the different first and second thresholds may be determined based on the entire length of the blower and the desired working angle.

Thus, having described several embodiments, those skilled in the art will recognize that various changes, additional structures, and equivalents may be used without departing from the spirit of the present invention. Accordingly, the above description should not be taken as limiting the scope of the present invention as defined by the following claims.

For example, although the blower shown in FIG. 1 uses a removable battery pack as a power supply, in other blower, such as a blower using an AC power supply, the control circuit of the present invention can also be used to realize intelligent activation.

The specific structural and functional details disclosed herein are only representative and are intended for describing exemplary embodiments of the disclosure. However, the disclosure can be embodied in many forms of substitution, and should not be interpreted as merely limited to the embodiments described herein.

What is claimed is:

1. A blower, comprising a housing, a n blowpipe connected to the housing, a motor located in the housing, and blades driven by the motor to generate air flow, wherein the blower further comprises a motion sensor; the motion sensor adapted to control the operation of the motor in accordance with a change of the blower in position or angle.

2. The blower according to claim 1, wherein the motion sensor is adapted to detect an angle formed by the blowpipe and a horizontal plane.

3. The blower according to claim 2, wherein the motion sensor is configured to control the motor start upon detecting that the angle between the blowpipe and the horizontal plane is greater than a first threshold; and to control the motor to stop upon detecting that the angle between the blowpipe and the horizontal plane is less than the first threshold.

4. The blower according to claim 3, wherein the motion sensor is configured to control the motor to stop upon detecting that the angle between the blowpipe and the horizontal plane is greater than a second threshold; the first threshold being less than the second threshold.

5. The blower according to claim 4, wherein the second threshold is 30 degrees.

6. The blower according to claim 3, wherein the first threshold is 15 degrees.

7. The blower according to claim 1, wherein the motion sensor is an angle detection sensor or a gyroscope.

8. The blower according to claim 1, further comprises a trigger switch for enabling/disabling the motion sensor.

* * * * *